United States Patent [19]

Sparling

[11] 4,315,653
[45] Feb. 16, 1982

[54] TRUCK ASSEMBLY

[76] Inventor: Darel L. Sparling, 24311 Lakeview La., El Toro, Calif. 92680

[21] Appl. No.: 72,014

[22] Filed: Sep. 4, 1979

[51] Int. Cl.³ .............................................. B60N 1/00
[52] U.S. Cl. ..................................... 296/63; 296/156; 29/401.1
[58] Field of Search .................... 296/99 A, 99 R, 56, 296/57 R, 63, 64, 163, 168, 10, 190, 156; 29/401.1

[56] References Cited

U.S. PATENT DOCUMENTS

| | | | |
|---|---|---|---|
| 3,169,792 | 2/1965 | Viquez | 296/99 |
| 3,508,786 | 4/1970 | Colville | 296/99 |
| 3,741,605 | 6/1973 | Lee | 296/99 X |
| 3,820,839 | 6/1974 | Molatalab | 296/137 B X |
| 3,833,253 | 9/1974 | Butler | 296/99 X |
| 3,840,263 | 10/1974 | Bowder | 296/64 X |
| 3,844,603 | 10/1974 | Bjork et al. | 296/166 |

Primary Examiner—Robert R. Song

[57] ABSTRACT

The present invention provides an improved housing shell that can be bifurcated into a base mounting member and an upper removable roof member. The shell is configured for mounting on a truck to enclose the truck bed. The truck bed can be modified to provide extra seating capacity with the rear of the cab removed and an aperture cut in the truck bed to receive an auxiliary floor member. Special bucket seats can be mounted over the rear wheel wells, or apertures can be cut in the rear wheel wells for mounting for bucket seats.

23 Claims, 7 Drawing Figures

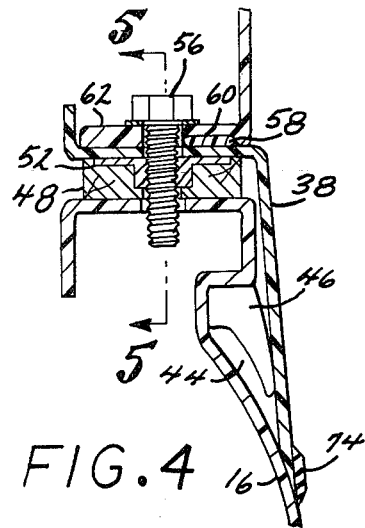
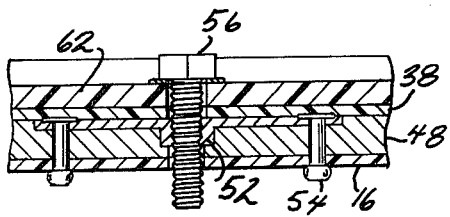
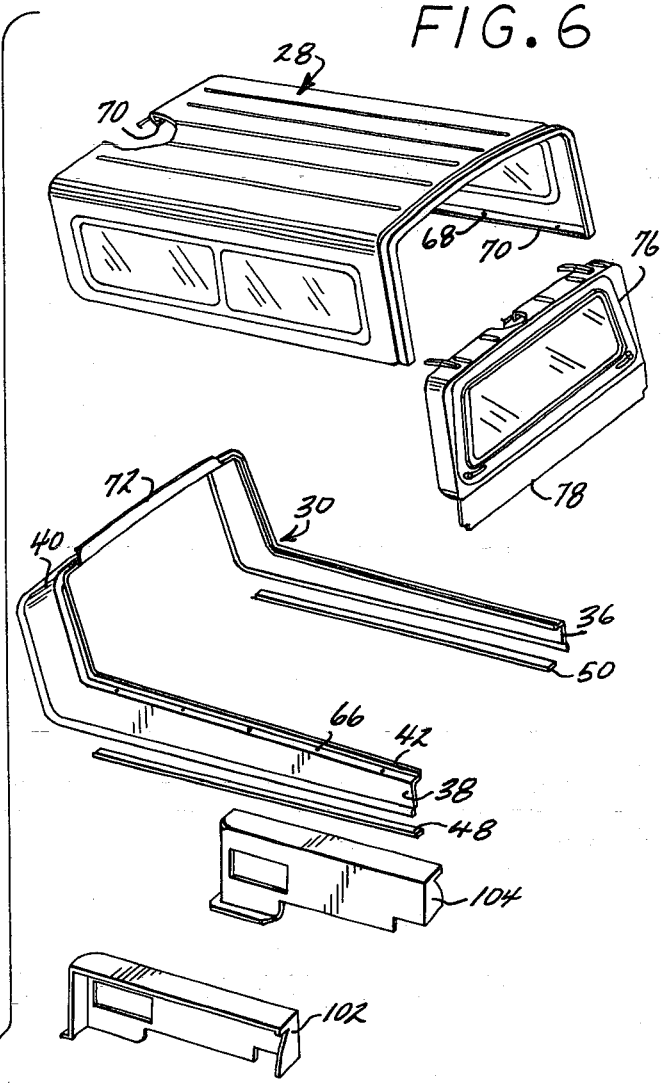
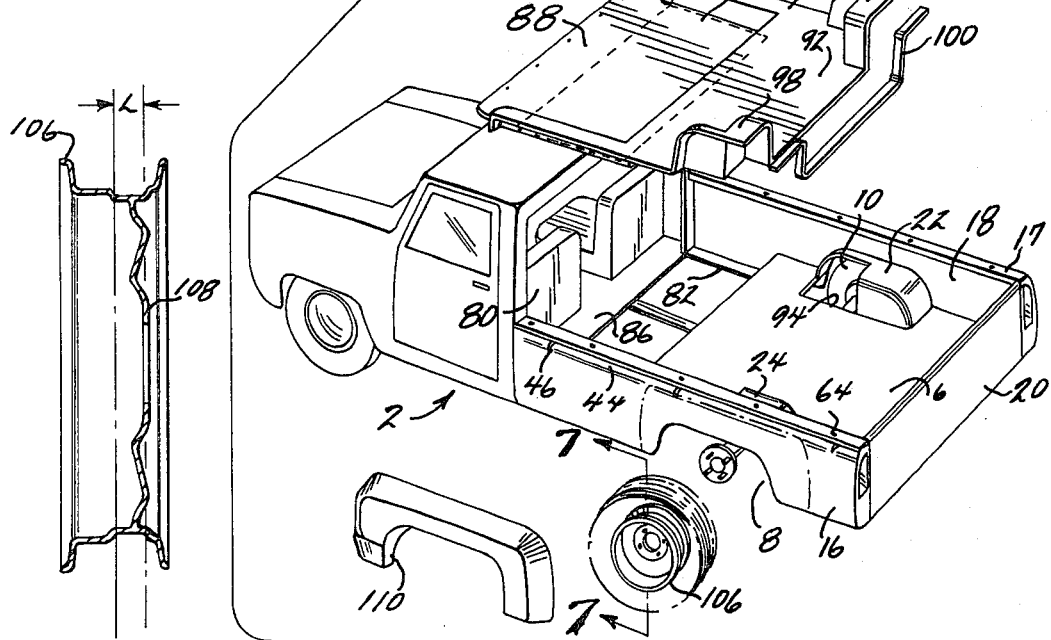

TRUCK ASSEMBLY

BACKGROUND OF THE INVENTION

1. Field of the Invention

The present invention is directed to a modification of a light-duty truck commonly referred to as a pick-up truck to provide improved seating capacity and a housing shell extending above the truck bed.

2. Description of the Prior Art

For a considerable period of time, purchasers of light-duty trucks have incorporated various commercial accessories to both personalize and improve the performance of these trucks. Camper shells have been a principle addition to quarter-ton and half-ton pick-up trucks.

Frequently, both the housing shell and the truck bed will be customized by various accessory features to convert the basic truck body into a recreational vehicle. A commercial demarcation line generally exists between the conversion of a truck bed with a camper shell and the desire of purchasers to have multiple seating capacity approximating the comfort and convenience of a car. Usually the latter purchaser would be forced to purchase a vehicle having both front and rear seats at an additional cost.

In light of the present energy crisis and the high costs of vehicles, there is a continued need in the prior art to provide a conversion of lightweight trucks into recreational vehicles with an increase in the capability of seating a number of people.

SUMMARY OF THE INVENTION

Present invention is directed to a modification of a truck vehicle having a forward cab with a front floor and an open truck bed with vertical sides extending over and forming rear wheel walls for the drive wheels. A truck housing shell comprising essentially two parts is adapted for mounting on the rear of the vehicle cab and the vertical sides of the truck bed. The housing shell includes a base mounting member capable of attachment to the vehicle vertical sides having a dimensional shape to conform to the periphery of the vertical sides and the forward cab and a removable upper roof member for attachment to the base mounting member. The base mounting member overlaps the upper external peripheral vertical sides of the vehicle for a sufficient distance to conceal any grooves or recesses containing tie down hooks on the vehicle sides. Additionally, the vehicle upper roof member includes a movable upper rear tailgate which extends in a closed position over the upper external surface of the lower vehicle tailgate.

During modification of the original truck body, the rear portion of the forward cab is removed and a first aperture is cut into the open horizontal truck bed, forward of the rear wheel well cavities. An auxiliary floor member is securely mounted in this first aperture in the truck bed to provide a substantial horizontal support surface that is complimentary to the floor surface of the forward cab portion and lower than the original truck bed. At least one seat member is mounted adjacent to the auxiliary floor member on the truck bed.

Preferably, a pair of second apertures are cut into the respective rear wheel well cavities on either side of the truck bed and mounting members extend therein to further close each aperture. By cutting into the rear wheel walls, it is possible for the seat members to be appropriately spaced and mounted to extend into the former cavity of the rear wheel wells and thereby provide adequate space for an aisle between the rear seats.

In the preferred embodiment, the auxiliary floor member is molded from a plastic resin with a central reinforced section which extends into the first aperture cut into the original truck bed. The auxiliary floor member further extends between the rear wheel well cavities and includes elevated portions which close the respective rear wheel well aperture cuts. To insure clearance for the rear wheels when the mounting of the seats extends into the well cavities, special rear wheel mounts are provided that extend the width of the rear wheel track length. Rear wheel fender covers can also be appended to the outer side surface of the truck body to provide adequate fenders for the rear wheels in conformance with State vehicle laws.

The features of the present invention which are believed to be novel are set forth with particularity in the appended claims. The present invention, both as to its organization and manner of operation, together with further objects and advantages thereof, may best be understood by reference to the following description, taken in conjunction with the accompanying drawings.

BRIEF DESCRIPTION OF THE DRAWINGS

FIG. 4 is a partial cross-sectional view of the housing shell and vertical sides of the truck.

FIG. 5 is a view taken along line 5—5 of FIG. 4.

FIG. 6 is a rear side exploded view of the present invention.

FIG. 7 is a cross-sectional view of a rear wheel mount.

DESCRIPTION OF THE PREFERRED EMBODIMENT

The following description is provided to enable any person skilled in automotive and truck industry to make and use the invention and sets forth the best modes contemplated by the inventor of carrying out his invention. Various modifications, however, will remain readily apparent to those skilled in these arts since the generic principles of the invention have been defined herein specifically to provide components for modification of a lightweight truck and can be easily manufactured and assembled.

Figure 1:
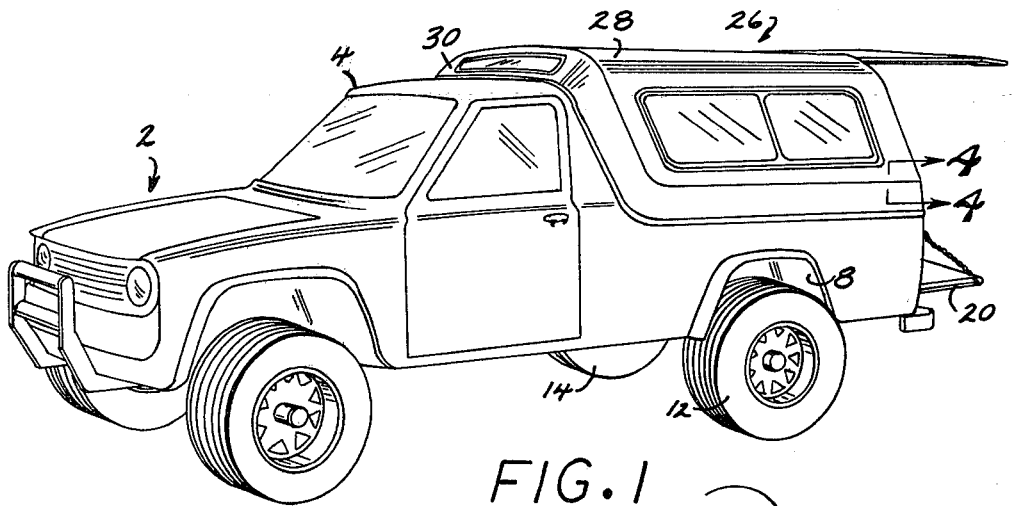
FIG. 1 is a front side perspective of a vehicle modified in accordance with the present invention.

Referring to FIG. 1, a lightweight vehicle truck 2 includes a forward cab portion 4 and a rear truck bed 6. The rear truck bed 6 is usually enclosed by vertical sides 16 and 18 and pivotable tailgate member 20. A pair of rear wheel well cavities 8 and 10 cover the respective upper portions of the rear wheels 12 and 14. Frequently, the interior of the vehicle sides 16 and 18 adjacent the truck bed horizontal surface are stamp forged as an integral part of an extension of the rear truck bed 6 and include the walls 22 and 24 of the rear wheel well cavities as protrusions on the horizontal bed surface.

The horizontal surface of the truck bed 6 is frequently provided with flutes or grooves that extend longitudinally parallel to the drive shaft. For ease of illustration, these are not disclosed in the present drawings.

Truck vehicles 2 of this general type are manufactured by a number of domestic and foreign companies and are generally characterized by a pair of bucket seats or a single bench seat in the forward cab portion 4 with a standard or an elongated truck bed 6.

The present invention also includes a bifurcated shell assembly 26 and additional components that permit a modification of the original manufacturers version of the vehicle 2 into a recreational vehicle that comfortably seats an additional 2 people above the rear truck bed 6. In this regard, the original vehicle body is modified by cutting out the rear of the forward cab portion 4 and the rear wheel well cavities 8 and traversely between the respective side walls 18 and 16, is removed and replaced with an auxiliary floor member. Additionally, in one embodiment of the invention at least one or both of the rear wheel well cavities 8 and 10 have apertures cut in their respective walls 22 and 24 to accommodate lateral spacing and mounting of rear bucket seats 32 and 34.

1. Housing Shell Assembly

The housing shell assembly is bifurcated into an upper roof member 28 and a lower base mounting member 30. Both the upper roof member 28 and the lower base mounting member 30 can be manufactured from a fiberglass reinforced plastic resin. The base mounting member 30 includes a pair of parallel side members 36 and 38 that are integrally joined by a U-shaped front member 40 extending between and elevated above the vertical height of the respective side members. A peripheral mounting flange 42 extends around the upper edge of the base mounting member 30.

The base mounting member sides 36 and 38 are dimensioned to extend below any vehicle longitudinal side grooves 44 and the extension of any recessed tie down hooks 46 are frequently provided on both sides of a truck vehicle 2 as can be seen from FIGS. 4 and 6. Thus when the base mounting member 30 is appropriately mounted on the vertical sides 16 and 18 of the rear truck bed 6, the respective side members 36 and 38 extend over and cover the upper exterior portion of the truck vertical sides to provide a highly pleasing and asthetic exterior appearance.

Mounting substrates 48 and 50 such as elongated boards of wood are first mounted on the upper edges 17 of the respective truck vertical sides 16 and 18 with a plurality of fastener brackets 52 that are secured directly onto the upper flat edges 17 by pop rivets 54 that extend through the substrates 48 and 50 as can be seen in FIG. 5. The brackets 52 have threaded bores 64 that are adapted to receive a threaded bolt 56. A peripheral rubber or plastic seal 58 is configured to fit in an elongated recess 60 that extends about the lower edge of a mounting flange 62 on the upper roof member 28. After the fastener brackets 52 are appropriately mounted above holes 64 on the flat upper surface edge 17 of the vertical sides, the lower base mounting member 30 is mounted so that its corresponding holes 66 are appropriately aligned with the holes 64 of the fastener brackets 52. Subsequently, the mounting seal 58 is positioned within the groove 60 and can be further secured to the same by an appropriate fasterner or adhesive. The upper roof member 28 having complimentary holes 68 on its upper roof inwardly extending upper mounting flange 62 is positioned on the lower base mounting member 30. An appropriate washer and mounting bolt 56 is inserted in each series of aligned holes for attachment to the appropriate fastener brackets 52.

Figure 2:
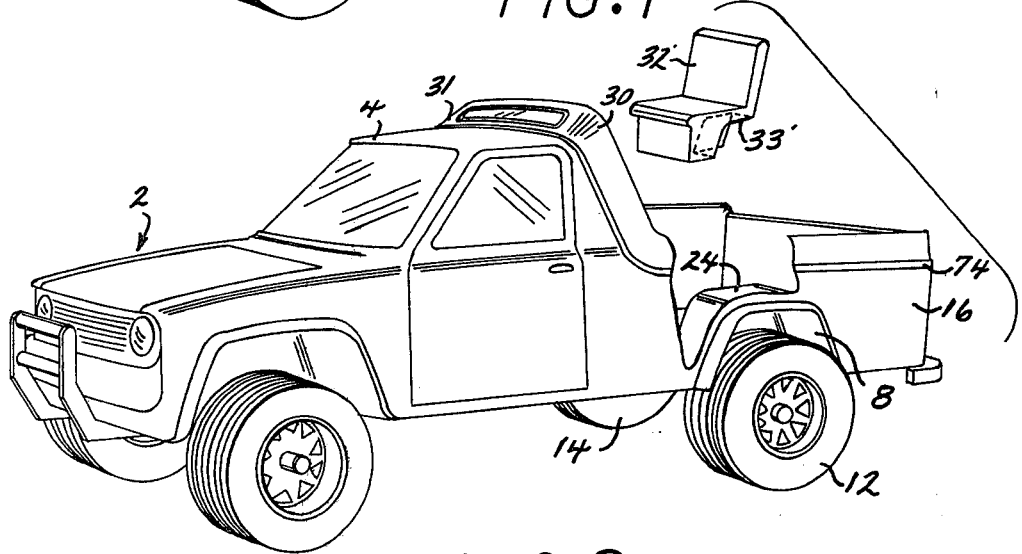
FIG. 2 is a front side perspective view of the vehicle with the upper roof member removed.
Figure 3:
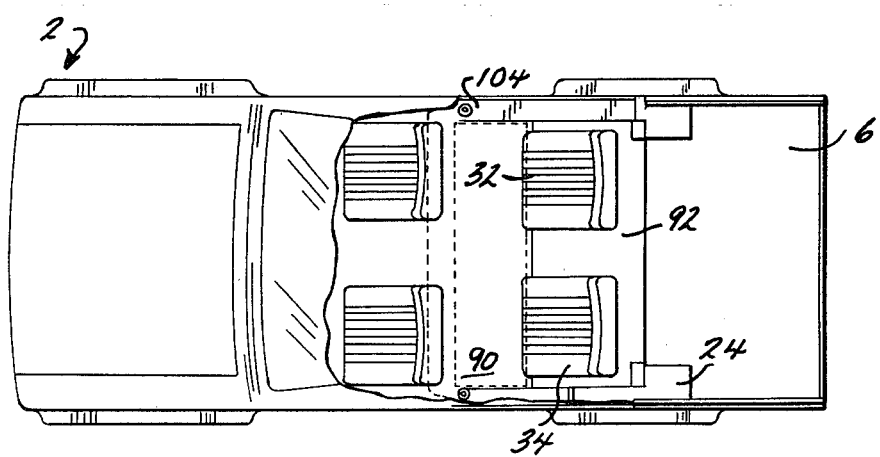
FIG. 3 is a plan view with a section of the forward cab portion removed.

As an additional feature of the present invention, the forward upper portion of the U-shaped member 40 of the upper roof member 28 has an inwardly extended flange 70 that is dimensioned to coact with a locking flange 72 on the lower base mounting member 30. This eliminates the necessity of supplemental fasteners. As should be readily apparent, it is also possible to utilize the mounting bolts 56 for securement of only the lower base mounting member as shown in the embodiment of FIG. 2.

A sealing strip 74 can be further utilized to cover the interface between the mounting member sides 36 and 38 and the respective vertical sides 16 and 18 of the truck. Also, a front window 31 can be optionally provided in the lower base mounting member 30.

A movable upper rear tailgate 76 is pivotedly mounted on the upper roof member 28. The upper tailgate 76 further includes an apron 78 that is dimensioned to extend, in a closed position, over the upper external surface of the vehicle tailgate 20. The purpose of the tailgate apron 78 is twofold, first, it improves the vehicle appearance for esthetic purposes, and secondly, it provides a security feature in that it prevents the opening of the vehicle tailgate 20 when the upper tailgate is in a locked position.

2. Rear Seat Modification Components

To convert the truck vehicle 2 into a recreational or other vehicle that is capable of seating at least four passengers in comfort, substantial modifications of the original vehicle body are necessary. As can be appreciated, in making these modifications by the removal of sections of the vehicle body, it is necessary to accommodate the cutting of both structural and interior features of the original equipment. For purposes of illustrating the main features of the present invention, only the major components are disclosed.

Referring to the exploded view of FIG. 6, an aperture 80 has been cut in the elevated vertical rear wall of the forward cab portion 4 to effectively remove the rear cab wall and provide access to the cab from the truck bed 6. While not shown, it should be appreciated that the interface between the interior surface and the exterior body can be closed in an appropriate decorative manner.

A second aperture 82 of approximately a rectangular configuration is cut in the horizontal surface of the truck bed 6. The aperture 82 extends between the vertical sides 16 and 18 and also between the rear of the forward cab portion to a position adjacent the walls 22 and 24 of the rear wheel wells.

An auxiliary floor member 84 is designed to fit within the aperture 82 and to extend into and over the forward cab floor 86. Basically, the floor member 84 is designed to provide a horizontal surface 90 which is lower than the original truck bed and is further complimentary to the cab floor 86. The floor member 84 can incorporate an additional support member such as a section of plyboard 88 that is actually laminated into the floor member 84. Preferably, the floor member 84 can be formed of a fiberglass reinforced plastic resin and molded to any desired shape. As can be appreciated, the specific dimensions of the floor member 84 can vary depending on the specific model and manufacturer of the truck vehicle 2. While the auxiliary floor member 84 disclosed in FIG. 6 sets forth a best mode of the present invention, it can be appreciated that different forms of floor members can be utilized. For example, a floor member having only the lower horizontal support surface 90 without the additional upper seat support surface 92 could be utilized. Fasteners such as pop rivets can secure the auxiliary floor members 84 to the forward cab floor 86.

Additional side apertures 94 can be cut into the walls 22 and 24 of the rear wheel wall cavities. These side apertures accommodate the lateral spaced positioning of the rear bucket seats 32 and 34 on the truck bed 6. To close these side apertures, a pair of cover members 96 and 98 can be integrally molded into the auxiliary floor member 84 to extend upward on either side of the upper seat support surface 92. Each of these cover members 96 and 98 are dimensioned to extend within the side apertures that have been cut into the respective rear wheel well walls 22 and 24. A fastener strip 100 can be used to secure the rear portion of the auxiliary floor member 84 to the truck bed 6.

Extended arm rest members 102 and 104 can be mounted adjacent to the rear seats and the respective vertical sides 16 and 18 of the truck. The rear bucket seats 32 and 34 are mounted onto the seat support surface 92 and extend into the space that was previously intersected by the rear wheel well walls 22 and 24 respectively.

An alternative embodiment of the present invention is disclosed in FIG. 2 and utilizes modified rear wheel seats with an auxiliary floor member that only includes the lower floor support surface 90. These modified bucket seats 32' have side cavities 33' which extend partially over and are configured to compliment the exterior surface of the rear wheel well walls. This version of the invention does not necessitate the cutting of the side apertures into these walls and accordingly is less expensive.

While four-wheel drive vehicles usually have an extended clearance between the chassis and the vehicle body, two drive wheel lightweight trucks position their rear tires into the rear wheel well cavities to a greater extent. Thus, it is necessary with these vehicles to extend the track or displacement width of the rear wheels 12 and 14. To accomplish this, a special wheel mount 106 is disclosed in FIG. 7. As can be seen the central mounting flange 106 is offset a distance L to thereby extend or displace the positioning of its respective tire. To insure that the resultant displacement of this rear wheel will conform with various State vehicle laws, a supplemental fender 110 can be provided on either side of the truck body.

In summary, the purchaser of a light-duty truck now has the option of converting it into a four passenger recreational vehicle in an economical manner. This is accomplished by removing the rear wall of the forward cab portion 4 and cutting at least a rectangular aperture in the truck bed 6 to accommodate an auxiliary floor member 84. When it is desired to provide the optimum spacing of rear bucket seats 32 and 34, additional apertures are cut in the rear wheel well walls 22 and 24. The auxiliary floor member is appropriately mounted to both the floor 86 of the cab and the truck bed 6. As can be appreciated, carpeting can be laid over the auxiliary floor member. The auxiliary floor member 84 includes a laminated support surface 90 for heavy-duty wear. Rear bucket seats 32 and 34 are then appropriately fastened above an upper seat support surface 92 in a conventional manner. Side arm rest members 102 are mounted adjacent each rear seat and optionally, a roll bar could also be installed as is conventional in recreational vehicles. The rear wheels are then extended by a special wheel mount 106 to prevent any interference in the positioning of the rear seats within a portion of the rear wheel well. Decorative fenders 110 can be added to extend over the displaced rear wheels.

A bifurcated shell assembly 26 can then be appropriately mounted on the vehicle. In this regard, a lower base mounting member 30 is attached to the upper edge 17 of the vehicle sides and also to the exterior of the forward cab 4. An upper roof member 28 then can be optionally secured to the lower base mounting member 30 to enclose the truck bed 6. As can be appreciated, a convertible style is achieved by removing the upper roof member 28 as can be seen in FIG. 2.

The dimension of the lower base mounting member 30 and the upper tailgate 76 on the upper roof member 28 are such to extend over respectively the vehicle sides and the lower rear tailgate. This configuration provides not only a highly esthetic appearance but also a practical function of locking the lower tailgate 20 and preventing any unauthorized access into the shell assembly 26.

As can be appreciated, a highly novel structure and truck assembly is provided to a conventional truck after the modifications of the present invention. While the preferred embodiments of the present invention have been described herein, it should be readily appreciated that workman skilled in this field can make various modifications within the teachings of the present invention and accordingly, the scope of the present invention should be determined solely by the following claims.

What is claimed is:

1. In a truck vehicle having a forward cab portion with a front floor and an open truck bed with vertical sides extending over and forming rear wheel wells that extend above the horizontal support surface of the truck bed, the improvement comprising:
   an aperture cut across the entire original truck bed and extending between the rear wheel wells and the cab front floor;
   an auxiliary floor member permanently mounted to cover the aperture in the truck bed and secured to the cab front floor to provide a substantially horizontal support surface complimentary to the front floor and lower than the original truck bed, the outer peripheral dimensions of the floor member complimenting the size of the aperture cut, and at least one seat member mounted above the auxiliary floor member on the truck bed at a sufficient height to permit an occupant's feet to rest, in a sitting position on the horizontal support surface.

2. The invention of claim 1 further including an aperture cut in the cab portion to remove the rear of the cab and the auxiliary floor member being dimensioned to extend from the rear wheel wells into the cab.

3. The invention of claim 1 wherein the auxiliary floor member is a plastic material and includes a support member embedded therein.

4. The invention of claim 1 wherein the auxiliary floor member has a flat base portion and an elevated peripheral flange extending adjacent three sides of the base portion.

5. The invention of claim 1 further including a fastener strip for securing the auxiliary floor member to the truck bed.

6. The invention of claim 1 further including a pair of side cover members extending above the auxiliary floor member and between the rear wheel wells and the forward cab portion.

7. The invention of claim 2 further including a shell base mounting member capable of attachment to the vehicle vertical sides and of such a dimensional shape to conform to the periphery of the vertical sides and rear portion of the forward cab, and an upper roof member capable of removable attachment to the base mounting member and forming therewith a vehicle housing shell.

8. The invention of claim 7 wherein the shell base mounting member extends over the upper external peripheral vertical sides of the vehicle.

9. The invention of claim 7 wherein the vehicle has a movable tailgate adjacent the truck bed and the upper roof member further includes a movable upper rear tailgate which extends, in a closed position, over the upper external surface of the vehicle tailgate.

10. The invention of claim 1 wherein the seat member has a side cavity of such a dimension to conform to and extend over at least a portion of the rear wheel wells that extend above the support surface.

11. In a vehicle having a forward cab portion with a front floor and an open truck bed extending over and forming rear wheel wells that extend above the horizontal support surface of the bed, the improvement comprising:
a first aperture in at least one rear wheel well terminating on the truck bed;
at least one mounting member extending into the first aperture and forming approximately one-half of the upper portion of a rear wheel well cavity;
at least one seat member operatively mounted onto the mounting member;
a second aperture in the original truck bed extending approximately across the width of the front floor and rearward into the open truck bed, and
an auxiliary floor member mounted in the aperture in the truck bed and having a dimension to cover the second aperture, the floor members include a substantially horizontal support surface that is lower than the original truck bed to lie in the same approximate plane of the front floor across a majority of its surface whereby an occupant sitting in the seat member will have his feet resting on the horizontal support surface.

12. The invention of claim 11 further including a third aperture cut in the cab portion to remove the rear of the cab and the auxiliary floor member being dimensioned to extend from the rear wheel wells into the cab.

13. The invention of claim 11 further including a pair of rear wheel mountings extending the width of rear wheel track length.

14. The invention of claim 13 further including rear wheel covers appended to the outer surface of the truck adjacent the rear wheel wells.

15. The invention of claim 11 further including a pair of seat members mounted on the mounting member and extending respectively into the former rear wheel well cavity.

16. The invention of claim 14 further including vertical sides adjacent the truck bed and a shell base mounting member capable of attachment to the vehicle vertical sides and of such a dimensional shape to conform to the periphery of the vertical sides and rear portion of the forward cab, and an upper roof member capable of removable attachment to the base mounting member and forming therewith a vehicle housing shell.

17. The invention of claim 16 wherein the shell base mounting member extends over the upper external peripheral vertical sides of the vehicle.

18. The invention of claim 17 wherein the vehicle has a movable tailgate adjacent the truck bed and the upper roof member further includes a movable upper rear tailgate which extends, in a closed position, over the upper external surface of the vehicle tailgate.

19. In a four-wheeled truck vehicle having a forward two-seat cab portion with an upper roof, side doors and an open rear portion, with a front floor supporting the cab seats, the vehicle originally designed to accommodate an open truck bed, extending over and rearward of the axle of the rear wheels, the improvement comprising:
an auxiliary floor member attached to and extending across approximately the width of the front floor and further extending rearward of the original cab portion thereof, the floor member having a first horizontal surface complimentary to the front floor and lying in approximately the same plane, and a second rear horizontal surface raising above and approximately parallel to the first surface and extending above the rear axle;
means for permanently mounting the auxiliary floor member to the front floor of the cab portion;
rear seat means mounted above the second horizontal support surface for accommodating rear passengers seated in alignment with the cab seats so that the feet of the passengers can contact the lower first horizontal surface of the floor member;
side arm rest members also mounted above the second horizontal support surface on either side of the seat means, and
rear shell means for closing the open rear portion of the forward cab and enclosing the rear seat means from the outside environment.

20. The invention of claim 19 wherein the floor member is formed of a plastic material.

21. The invention of claim 20 wherein the floor member forms at least a portion of a rear wheel housing on each side of the vehicle and extends forward into the cab portion.

22. The invention of claim 21 further including plastic rear wheel fenders.

23. The invention of claim 21 wherein the rear shell means includes an upper roof portion of plastic resin and a vehicle tailgate, the tailgate having a greater height than the upper roof portion and capable of pivoting upward relative to the upper roof portion.

* * * * *